(12) United States Patent
Fujio

(10) Patent No.: US 10,202,245 B1
(45) Date of Patent: Feb. 12, 2019

(54) CONVEYOR DEVICE

(71) Applicant: Daifuku Co., Ltd., Osaka-shi, Osaka (JP)

(72) Inventor: Yoshihiko Fujio, Shiga (JP)

(73) Assignee: Daifuku Co., Ltd., Osaka-shi, Osaka (JP)

(*) Notice: Subject to any disclaimer, the term of this patent is extended or adjusted under 35 U.S.C. 154(b) by 0 days.

(21) Appl. No.: 16/077,517

(22) PCT Filed: Feb. 13, 2017

(86) PCT No.: PCT/JP2017/005108
§ 371 (c)(1),
(2) Date: Aug. 13, 2018

(87) PCT Pub. No.: WO2017/141865
PCT Pub. Date: Aug. 24, 2017

(30) Foreign Application Priority Data

Feb. 19, 2016 (JP) .................. 2016-029439

(51) Int. Cl.
*B65G 47/40* (2006.01)
*B65G 17/34* (2006.01)
*B65G 47/96* (2006.01)

(52) U.S. Cl.
CPC .......... *B65G 47/40* (2013.01); *B65G 17/345* (2013.01); *B65G 47/965* (2013.01); *B65G 2201/02* (2013.01); *B65G 2207/18* (2013.01)

(58) Field of Classification Search
CPC ..... B65G 47/40; B65G 17/345; B65G 47/965
USPC ....................... 198/370.01, 370.04
See application file for complete search history.

(56) References Cited

U.S. PATENT DOCUMENTS

| | | | |
|---|---|---|---|
| 3,231,066 A * | 1/1966 | Harrison | B07C 3/082 198/370.04 |
| 5,255,774 A | 10/1993 | Yokoya | |
| 5,667,054 A * | 9/1997 | van den Goor | B65G 17/066 198/370.04 |
| 5,746,301 A * | 5/1998 | Maier | B65G 47/962 198/370.04 |

(Continued)

FOREIGN PATENT DOCUMENTS

JP  61-041116 U1  3/1986
JP  H05-162846 A  6/1993

(Continued)

OTHER PUBLICATIONS

Decision to Grant issued in connection with JP 2016-029439, dated Nov. 5, 2018.

(Continued)

*Primary Examiner* — Douglas A Hess
(74) *Attorney, Agent, or Firm* — Kusner & Jaffe

(57) ABSTRACT

A conveyor device for conveying articles includes: travel units, trays provided for the respective travel units, and infill plates, each covering a clearance left between the trays. A swing bar supports the infill plate so as to vertically swing the infill plate and is provided at a position shifted by a predetermined distance L in a direction opposite to the traveling direction of the travel unit from the position of a coupler connecting the travel unit supporting a plate-tilting shaft and the travel unit traveling ahead, the plate-tilting shaft supporting the infill plate so as to laterally tilt the infill plate.

4 Claims, 4 Drawing Sheets

(56) References Cited

U.S. PATENT DOCUMENTS

| | | | | |
|---|---|---|---|---|
| 5,826,704 | A | 10/1998 | Van Den Goor | |
| 6,050,390 | A * | 4/2000 | Fortenbery | B65G 11/023 |
| | | | | 193/33 |
| 6,135,262 | A * | 10/2000 | Polling | B65G 47/962 |
| | | | | 198/370.04 |
| 6,360,868 | B1 * | 3/2002 | Arlt | B65G 17/345 |
| | | | | 198/370.06 |
| 6,607,066 | B1 * | 8/2003 | Andersen | B65G 17/345 |
| | | | | 198/370.04 |
| 6,814,218 | B2 * | 11/2004 | Nishihara | B65G 35/06 |
| | | | | 198/370.04 |
| 7,337,892 | B2 * | 3/2008 | Groot | B65G 17/066 |
| | | | | 198/369.3 |
| 7,431,164 | B2 * | 10/2008 | Groot | B65G 47/962 |
| | | | | 198/370.04 |
| 9,902,569 | B2 * | 2/2018 | Lykkegaard | B65G 47/962 |

FOREIGN PATENT DOCUMENTS

| | | |
|---|---|---|
| JP | 08-239116 A | 9/1996 |
| WO | WO 00/02802 A1 | 1/2000 |

OTHER PUBLICATIONS

International Search Report from corresponding International Patent Application No. PCT/JP17/05108, dated May 16, 2017.

* cited by examiner

CONVEYOR DEVICE

FIELD OF THE INVENTION

The present invention relates to a conveyor device for conveying articles and particularly relates to a conveyor device including article supports such as trays that are provided on their respective travel units so as to travel on a conveying path.

BACKGROUND OF THE INVENTION

A conveyor device according to the related art includes article supports such as trays that are provided on their respective travel units so as to travel on a conveying path. In such a conveyor device, a clearance is left between the adjacent article supports. The clearance is covered with an infilling member such as a cover, thereby preventing an article from being dropped or caught into the clearance. For example, in WO 00/02802 ("Patent Literature 1"), a cover member (infilling member) is slidably attached to the underside of an article support so as to cover a gap (clearance) left between the article supports of adjacent conveyor units.

In the conveyor device, the article support is provided so as to tilt relative to a travel unit. An article on the article support is discharged to a chute that includes a slope with a tilted surface or a conveyor, e.g., a roller conveyor. When the article on the article support is discharged to the chute, the infilling member is tilted with the article support.

SUMMARY OF THE INVENTION

In the conveyor device according to the related art, however, when the article support and the infilling member travel on a curve of a conveying path in a tilted position (For example, if an article is discharged to a chute provided on a curve of the conveying path or if the article support and the infilling member are tilted to discharge an article to a chute provided on a linear part of the conveying path and then the article support and the infilling member do not recover from the tilted position due to some malfunctions), the infilling member may be twisted and excessively come into contact with the article support or an extremely large clearance may be left between the infilling member and the article support. This may break the infilling member on a curve of the conveying path.

An object of the present invention is to provide a conveyor device including an infilling member that covers a clearance left between adjacent article supports, the conveyor device being capable of preventing damage to the infilling member that tilts with the article support on a curve of a conveying path.

A solution to the technical problem of the present invention will be discussed below.

A conveyor device according to the present invention is a conveyor device for conveying articles, the conveyor device including a plurality of travel units traveling along a conveying path for the articles; article supports that support the articles and are provided for the respective travel units so as to travel on the conveying path; and infilling members provided for the respective article supports, the infilling member covering a clearance left between the article supports adjacent to each other along a traveling direction of the travel unit, in which the travel unit supports the article support and the infilling member so as to laterally tilt the article support and the infilling member with respect to the traveling direction, the travel unit is connected via a coupler to the adjacent travel unit in the traveling direction, the infilling member covers a clearance left between the article support supported by the travel unit supporting the infilling member and the article support supported by the travel unit that travels ahead of the travel unit supporting the infilling member, the infilling member is supported by a tilting shaft so as to laterally tilt with respect to the traveling direction of the travel unit, the tilting shaft being extended in the traveling direction of the travel unit and supported by the travel unit, the infilling member is supported by a swing shaft so as to vertically swing with respect to the traveling direction of the travel unit, the swing shaft being laterally extended with respect to the traveling direction of the travel unit and supported by the tilting shaft, and the swing shaft is disposed at a position shifted by a predetermined distance in a direction opposite to the traveling direction of the travel unit from a position of the coupler connecting the travel unit supporting the tilting shaft and the travel unit traveling ahead.

In this configuration, the infilling member vertically swings, with respect to the traveling direction of the travel unit, about the swing shaft disposed at a position shifted for a predetermined distance in a direction opposite to the traveling direction of the travel unit from the position of the coupler connecting the travel units.

According to the present invention, in the conveyor device, the predetermined distance for the swing shaft is determined according to the length of the travel unit in the traveling direction.

In this configuration, the position of the swing shaft with respect to the coupler is set according to the length of the travel unit in the traveling direction.

According to the present invention, in the conveyor device, the predetermined distance for the swing shaft is determined according to the width of the article support.

In this configuration, the position of the swing shaft with respect to the coupler is set according to the width of the article support.

According to the present invention, in the conveyor device, the swing shaft supports the infilling member above the rear end of the tilting shaft, and the coupler connects the travel units below the front end of the tilting shaft.

In this configuration, the position of the swing shaft with respect to the coupler is set with reference to the tilting shaft.

According to the conveyor device of the present invention, the pivot (swing shaft) for vertically swinging the infilling member is shifted in a direction opposite to the traveling direction of the travel unit from the position of the coupler connecting the travel units. This can suppress the twisting of the infilling member on a curve of the conveying path, prevent the infilling member and the article support from unnecessarily coming into contact with each other, and prevent an extremely large clearance from being left between the infilling member and the article support. Thus, damage to the infilling member can be prevented on a curve of the conveying path.

DETAILED DESCRIPTION OF THE EMBODIMENTS

A conveyor device 10 will be described as an example of an embodiment of the present invention. In the following explanation, a conveying direction W of an article 12 to be conveyed by the conveyor device 10 (the traveling direction of a travel unit 20) will be described as the front-and-rear direction of the conveyor device 10, whereas a horizontal direction crossing the conveying direction W of the article 12 will be described as the lateral direction of the conveyor device 10.

Figure 1:
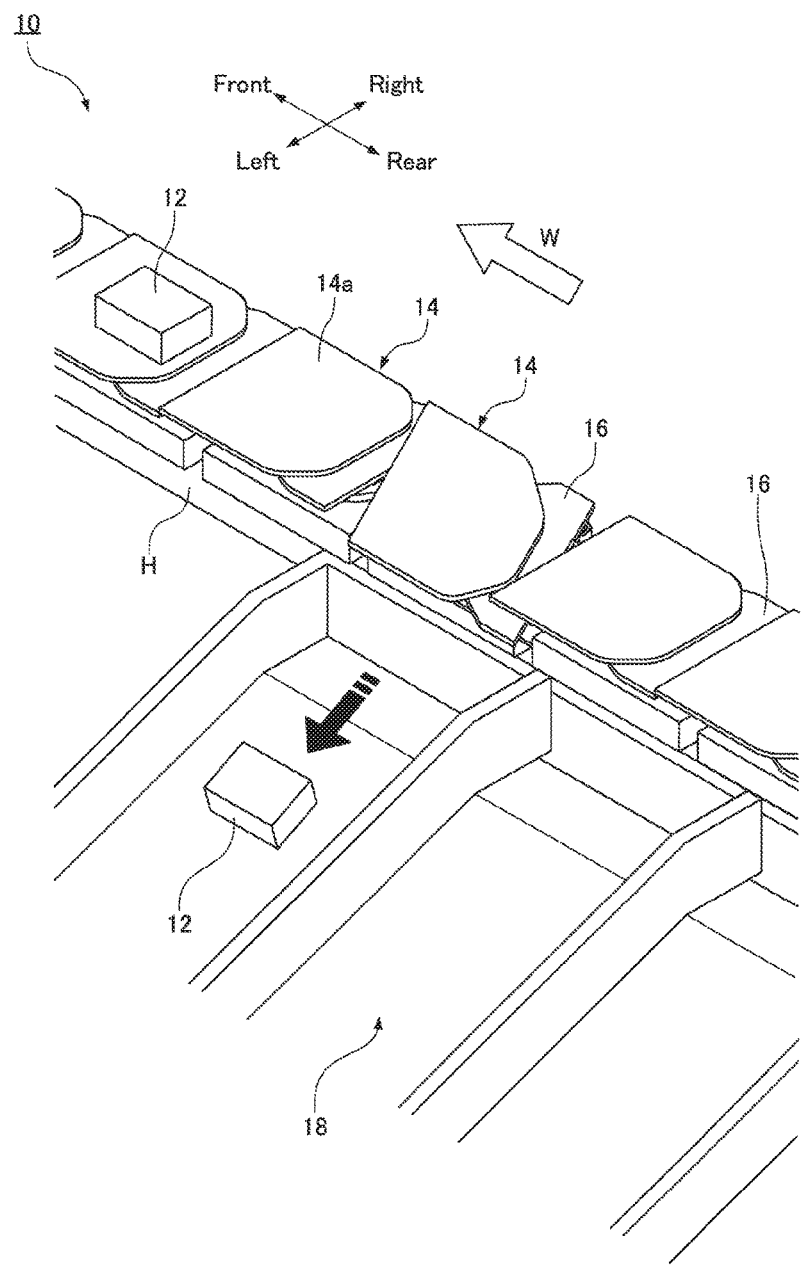
FIG. 1 is a perspective view showing a conveyor device according to the present invention.
Figure 2:
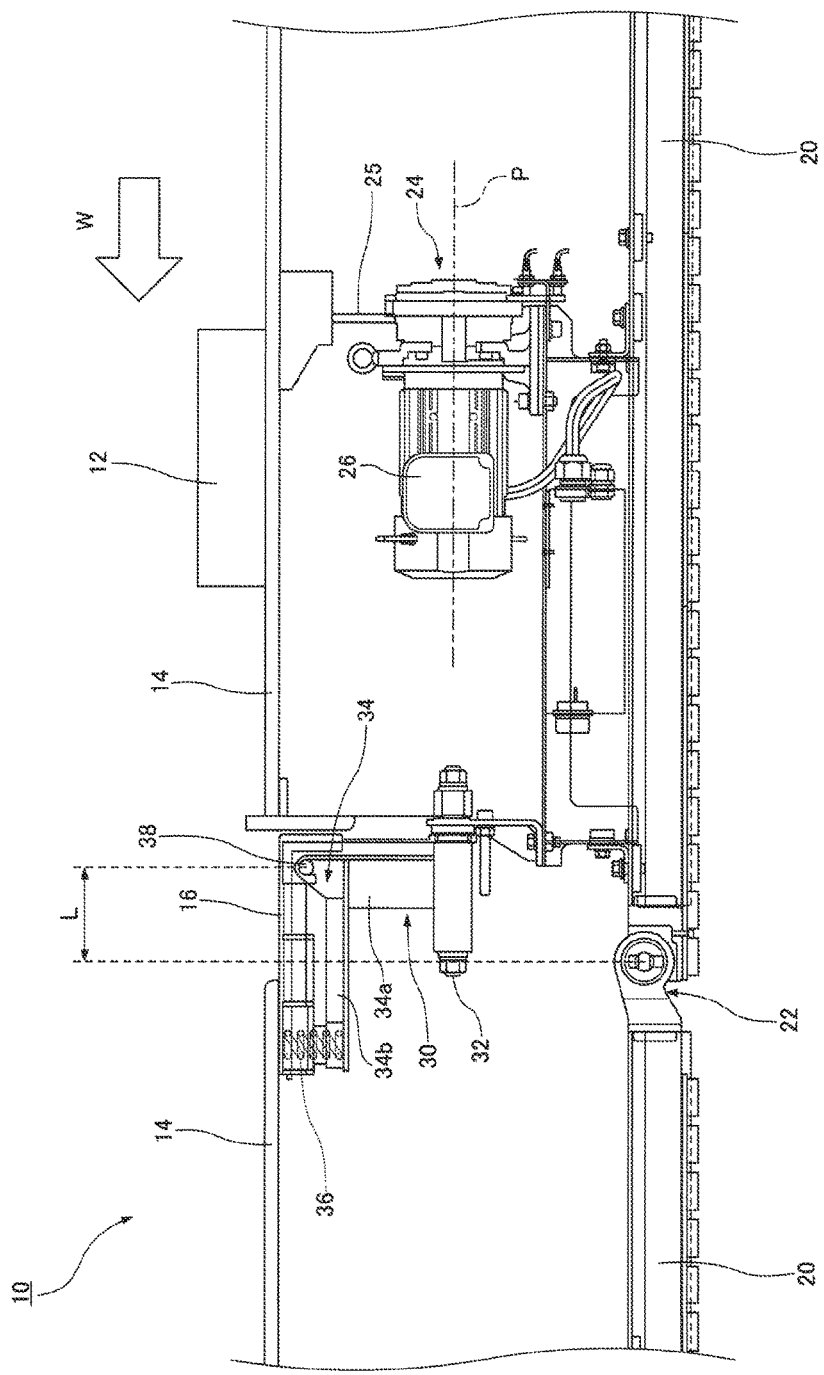
FIG. 2 is a side view showing the conveyor device according to the present invention.

As shown in FIGS. 1 and 2, the conveyor device 10 mainly includes a plurality of trays 14 (an example of "article support") that support articles 12, a plurality of infill plates 16 (an example of "infilling member") that are provided for the respective trays 14 so as to cover clearances left between the trays 14, and a plurality of travel units 20 that travel along a conveying path H of the articles 12. In the conveyor device 10, the article 12 placed on the tray 14 is conveyed in the conveying direction W along a conveying path H.

The trays 14 are arranged in series along the conveying direction W. Each of the trays 14 can support the article 12 on an article support surface 14a, which is the top surface of the tray 14. The tray 14 can be laterally tilted with respect to the conveying direction W by the driving force of a motor 26 provided below the tray 14 (FIG. 1 only shows tilting to the left). The article support surface 14a, which is the top surface of the tray 14, is tilted from a horizontal state, so that the article 12 placed on the article support surface 14a is discharged to any one of chutes 18 disposed along the conveying path H.

The infill plate 16 is provided for the corresponding tray 14 so as to cover a clearance left between the two trays 14 longitudinally arranged along the conveying direction W (adjacent to each other along the traveling direction of the travel unit 20). Specifically, the infill plate 16 is provided so as to cover a clearance left between the tray 14 supported by the travel unit 20 supporting the infill plate 16 and the tray 14 supported by the travel unit 20 traveling ahead of the travel unit 20 supporting the infill plate 16. This prevents the article 12 from partially or entirely falling into a clearance between the trays 14. The infill plate 16 is tilted by a pressing force of the corresponding tray 14 when the tray 14 is tilted (the tray 14 supported by the travel unit 20 traveling ahead of the travel unit 20 supporting the infill plate 16).

Figure 3:
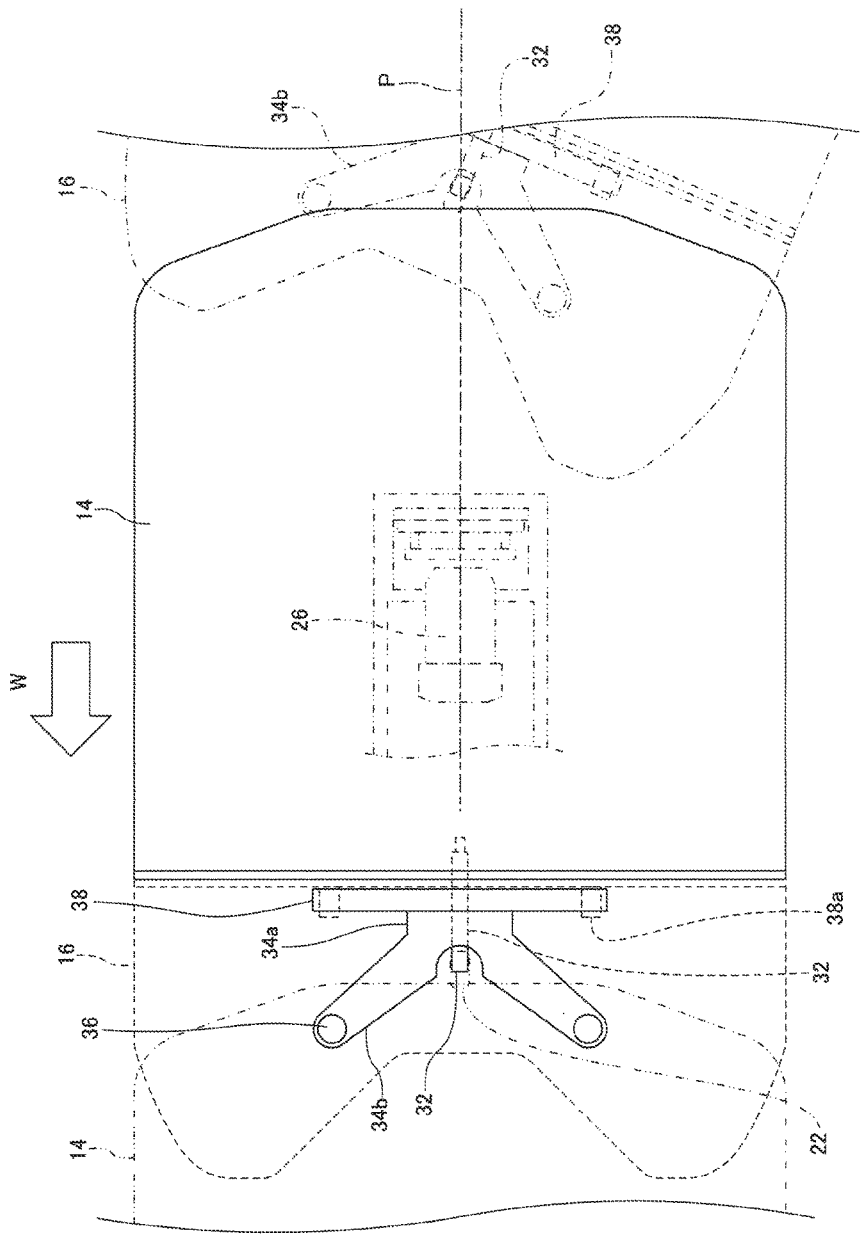
FIG. 3 is a plan view showing the conveyor device according to the present invention.

As indicated by broken lines in FIG. 3, the infill plate 16 is as large as the tray 14 in the width direction (a direction crossing the conveying direction W) and is longer than a clearance between the trays 14 in the front-and-rear direction along the conveying direction W. The infill plate 16 is longer than the clearance between the trays 14 in the front-and-rear direction and thus extends from the front end of the rear tray 14 (the tray 14 indicated by a solid line on the right side in FIG. 3) to the bottom of the rear of the front tray 14 (the tray 14 indicated by a virtual line on the left side in FIG. 3), thereby completely covering the clearance between the trays 14 in the front-and-rear direction.

As indicated on the right end in FIG. 3, when the series of trays 14 travels on a curve of the conveying path H, the traveling direction of the trays 14 and the traveling direction of the infill plate 16 cross each other. Thus, unlike in traveling on a linear part of the conveying path H, a vertically overlapping area of the tray 14 and the infill plate 16 is small on one side (the right side in FIG. 3) and is large on the other side (the left side in FIG. 3) in the width direction. For this reason, the right and left parts of the infill plate 16 in the width direction are formed longer in the front-and-rear direction than the central part of the infill plate 16 in the width direction in order to completely cover the clearance.

As shown in FIG. 2, the travel unit 20 is substantially shaped like a rectangular plate longitudinally extended along the conveying direction W. The travel unit 20 travels along a rail (not shown in FIG. 2) laid along the conveying path H. The travel units 20 longitudinally arranged (adjacent to each other in the traveling direction of the travel unit 20) along the conveying direction W are connected to each other via a coupler 22. Specifically, the front end of the travel unit 20 and the rear end of the travel unit 20 are connected to each other via a coupler 22. The travel units 20 connected via the coupler 22 are configured so as to vertically and horizontally pivot about the coupler 22. Thus, even if the series of travel units 20 connected via the coupler 22 travels along curves or ups and downs in the conveying path H, the travel units 20 can travel along the shape of the conveying path H.

Figure 4:
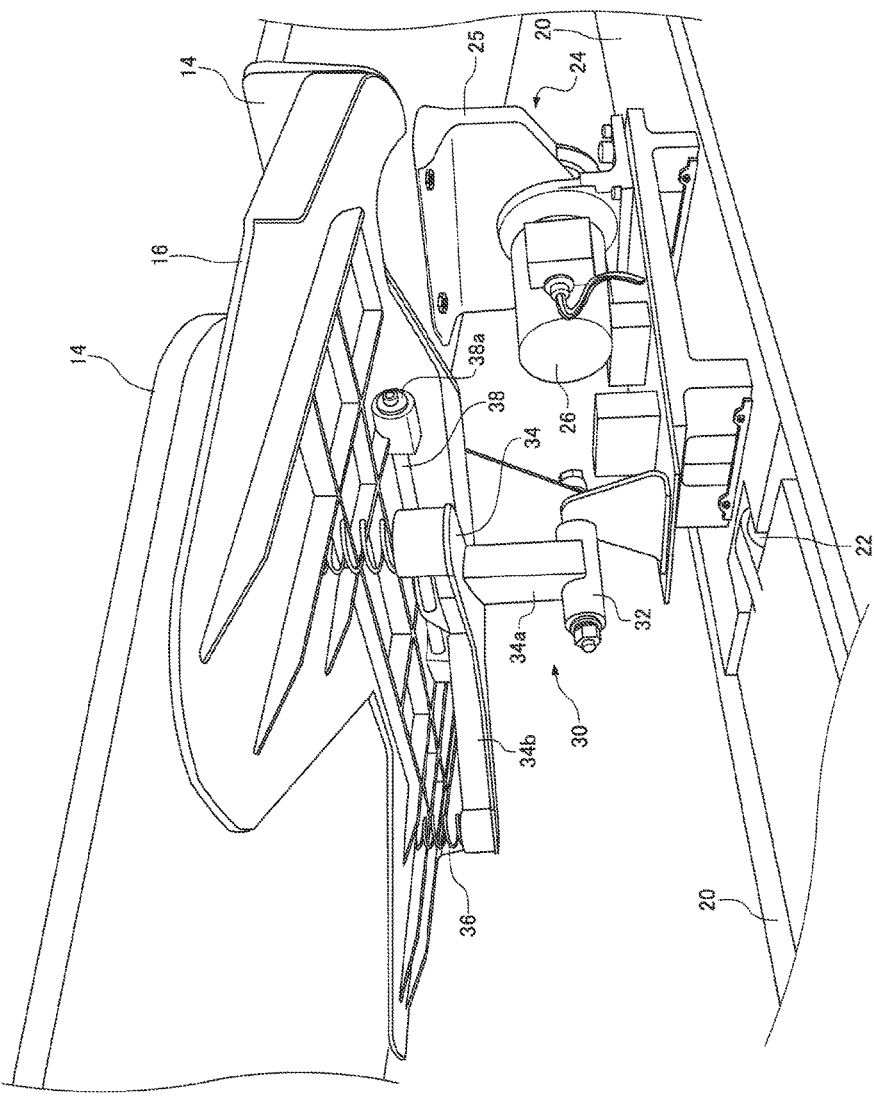
FIG. 4 is a bottom perspective view showing the conveyor device according to the present invention.

As shown in FIGS. 2 and 4, the travel unit 20 supports the tray 14 and the infill plate 16 so as to travel on the conveying path H. Specifically, the travel unit 20 supports the infill plate 16 at the front of the travel unit 20 in the conveying direction W (the traveling direction of the travel unit 20) and supports the tray 14 at the center of the travel unit 20. In other words, the infill plate 16 is placed in front of the tray 14 on the same travel unit 20.

The travel unit 20 supports the tray 14 at a tilting part 24 so as to laterally tilt the tray 14 with respect to the conveying direction W (the traveling direction of the travel unit 20).

The tilting part 24 mainly includes a tray support member 25 that supports the tray 14 and the motor 26 that rotates the tray support member 25.

The tray support member 25 is vertically extended from the underside of the tray 14 and is supported by a shaft (not shown) that is extended in parallel with the conveying direction W (the traveling direction of the travel unit 20) and is rotated by the motor 26. The tray support member 25 is pivoted about an axis P of the shaft rotated by the motor 26, by a driving force of the motor 26. The tray support member 25 is pivoted about the axis P and thus is laterally rotated with respect to the conveying direction W (the traveling direction of the travel unit 20), so that the article support surface 14a of the tray 14 supported by the tray support member 25 is laterally tilted with respect to the conveying direction W (the traveling direction of the travel unit 20).

The travel unit 20 supports the infill plate 16 at a plate support part 30 so as to laterally tilt the infill plate 16 with respect to the conveying direction W (the traveling direction of the travel unit 20).

The plate support part 30 mainly includes a plate support member 34 that supports the infill plate 16 and a plate-tilting shaft 32 (an example of "tilting shaft") that supports the plate support member 34 so as to tilt the plate support member 34.

The plate-tilting shaft 32 is a rod member axially extended along the conveying direction W (extended in the traveling direction of the travel unit 20). The plate-tilting shaft 32 is rotatably supported by the travel unit 20 at the rear part of the plate-tilting shaft 32. Moreover, the plate-tilting shaft 32 is coaxial with the axis P of the shaft (the shaft for tilting the tray 14) rotated by the motor 26.

The plate support member 34 is supported by the plate-tilting shaft 32 in front of a part where the travel unit 20 supports the plate-tilting shaft 32. The plate support member 34 is pivoted about the axis of the plate-tilting shaft 32 by tilting the infill plate 16 with a pressing force of the tray 14.

As shown in FIGS. 2 and 4, the plate support member 34 includes a vertical part 34a that is connected to the plate-tilting shaft 32 and is vertically extended upward, and front extending parts 34b that extend forward from the upper end of the vertical part 34a in the conveying direction W.

Moreover, the plate support member 34 includes a swing bar 38 (an example of "swing shaft") provided on the rear ends the front extending parts 34b so as to laterally extend with respect to the conveying direction W (the traveling direction of the travel unit 20). The plate support member 34 includes springs 36 vertically extending upward and respectively provided on the front ends of the front extending parts 34b.

The plate support member 34 supports the infill plate 16 from below by means of the springs 36 and the swing bar 38. Specifically, the plate support member 34 urges the front side of the infill plate 16 from below by means of the springs 36 and supports the infill plate 16 so as to vertically swing the infill plate 16 by means of the swing bar 38.

The swing bar 38 is laterally extended from the rear ends of the front extending parts 34b of the plate support member 34, with respect to the conveying direction W (the traveling direction of the travel unit 20). The swing bar 38 supports the infill plate 16 above the rear end of the plate-tilting shaft 32 so as to swing the infill plate 16. Specifically, at the center of the rear of the infill plate 16, the swing bar 38 is disposed along the rear end of the infill plate 16 and supports the rear end so as to swing the infill plate 16. The swing bar 38 is fit into a bar fitting portion 38a formed below the rear end of the infill plate 16, so that the swing bar 38 is connected to the rear end of the infill plate 16. The bar fitting portion 38a is formed in a groove or a hole where the swing bar 38 can be fit.

The infill plate 16 is urged from below by the springs 36, so that the front end of the infill plate 16 is pressed upward with the swing bar 38 serving as a pivot. Moreover, the infill plate 16 is urged from above by the corresponding tray 14, so that the front end of the infill plate 16 is pressed downward with the swing bar 38 serving as a pivot. In this way, the infill plate 16 vertically swings around the swing bar 38 serving as a pivot.

As shown in FIG. 2, in the conveyor device 10, the shaft for tilting the tray 14 (the shaft rotated by the motor 26) and the shaft for tilting the infill plate 16 (plate-tilting shaft 32) are formed by separate shafts (not the same shaft) on the same straight line (on the axis P).

As shown in FIG. 3, in the conveyor device 10, unlike in traveling on a linear part of the conveying path H, a vertically overlapping area of the tray 14 and the infill plate 16 on a curve of the conveying path H is small on one side (the right side in FIG. 3) and is large on the other side (the left side in FIG. 3) in the width direction.

Furthermore, in the conveyor device 10, the infill plate 16 is tilted by a pressing force of the corresponding front tray 14 when the tray 14 is tilted (the tray 14 supported by the travel unit 20 traveling ahead of the travel unit 20 supporting the infill plate 16). In other words, the infill plate 16 (tilted separately from the rear tray 14) is not tilted in synchronization with the tilting of the rear tray 14 (the tray 14 supported by the travel unit 20 traveling ahead of the travel unit 20 supporting the infill plate 16).

Thus, when the conveyor device 10 travels on a curve of the conveying path H, the travel units 20 adjacent to each other in the traveling direction of the travel unit 20 keep a predetermined angle. In this case, the predetermined angle is determined by the length of the travel unit 20 in the longitudinal direction and the curvature radius of a curve.

When the tray 14 and the infill plate 16 are tilted on a curve of the conveying path H while the travel units 20 keep the predetermined angle, the tilting position (angle of tilt) of the tray 14 and the tilting position (angle of tilt) of the infill plate 16 on the curve are displaced from each other, thereby twisting the infill plate 16. Specifically, if the tray 14 and the infill plate 16 are tilted inward with respect to a curve (to the inside of the curve) on the conveying path H (inward tilt), the infill plate 16 is twisted with the largely bent underside and the slightly bent top side. If the tray 14 and the infill plate 16 are tilted outward with respect to a curve (to the outside of the curve) on the conveying path H (outward tilt), the infill plate 16 is twisted so as to separate from the corresponding tray 14.

Hence, if the conveyor device 10 travels on a curve on the conveying path H, the tray 14 and the infill plate 16 may excessively come into contact with each other or an extremely large clearance may be left between the tray 14 and the infill plate 16.

Thus, as shown in FIG. 2, the conveyor device 10 is configured such that the swing bar 38 is shifted from the position of the coupler 22 in a direction opposite to (rearward) the conveying direction W (the traveling direction of the travel unit 20) and the pivot for vertically (perpendicularly) swinging the infill plate 16 is shifted rearward from the position of the coupler 22. In other words, the pivot for swinging the infill plate 16 is shifted rearward from the connecting position of the travel units 20. Specifically, the shifted swing bar 38 is disposed at a position shifted rearward by a predetermined distance L from the position of the coupler 22 connecting the travel unit 20 including the swing bar 38 and the travel unit 20 traveling ahead.

The infill plate 16 vertically (perpendicularly) swings about the position shifted rearward from the connecting position of the travel units 20, so that the infill plate 16 is twisted at a point separated from the pivot for vertically (perpendicularly) swinging the infill plate 16. Thus, a displacement is corrected between the tilting position (angle of tilt) of the tray 14 and the tilting position (angle of tilt) of the infill plate 16 on the curve of the conveying path H, thereby tilting the tray 14 and the infill plate 16 on the curve of the conveying path H without causing interference.

The predetermined distance L is set according to the length of the travel unit 20 in the traveling direction. In this case, the length of the travel unit 20 in the traveling direction is the length of the travel unit 20 in the longitudinal direction (front-and-rear direction), that is, a length from the coupler 22 connecting the front travel unit 20 to the coupler 22 connecting the rear travel unit 20. The predetermined distance L is preferably set at 5% to 20% of the length of the travel unit 20 in the traveling direction.

If the predetermined distance L is shorter than 5% of the length of the travel unit 20 in the traveling direction (if the predetermined distance L is extremely short), inward tilt may excessively twist the infill plate 16 and excessively deform the springs 36, resulting in a problem. Moreover, outward tilt may prevent the infill plate 16 from coming into contact with the tray 14 to cause rattling noise, resulting in a problem.

If the predetermined distance L is larger than 20% of the length of the travel unit 20 in the traveling direction (if the predetermined distance L is extremely large), outward tilt may cause the tray 14 to gradually press the infill plate 16 so as to excessively twist the infill plate 16, resulting in a problem. Moreover, there is no space for installing the motor 26 for tilting the tray 14, resulting in a problem.

The predetermined distance L is set according to the width of the tray 14 or the infill plate 16. In this case, the width of the tray 14 or the infill plate 16 is the length of the tray 14 or the infill plate 16 in the width direction (a direction crossing the conveying direction W). The infill plate 16 having a large width is likely to be affected by twisting, whereas the infill plate 16 having a small width is likely to be twisted. Thus, the predetermined distance L is optimally set according to the width of the infill plate 16.

In order to shift the swing bar 38 rearward from the position of the coupler 22, the plate support member 34 that supports the infill plate 16 is provided on the rear end of the plate-tilting shaft 32, and the coupler 22 is provided below the front end of the plate-tilting shaft 32. Thus, the swing bar 38 supports the infill plate 16 above the rear end of the plate-tilting shaft 32. Moreover, the coupler 22 connects the travel units 20 below the front end of the plate-tilting shaft 32.

Thus, in the conveyor device 10, the pivot (swing bar 38) for vertically (perpendicularly) swinging the infill plate 16 is shifted by the predetermined distance L in a direction opposite to (rearward) the traveling direction of the travel unit 20 from the position of the coupler 22 connecting the travel units 20. This can suppress the twisting of the infill plate 16 on a curve of the conveying path H and correct a displacement between the tilting position (angle of tilt) of the tilted tray 14 and the tilting position (angle of tilt) of the infill plate 16 on a curve of the conveying path H. Hence, the tray 14 and the infill plate 16 do not excessively come into contact with each other and an extremely large clearance is not left between the tray 14 and the infill plate 16. This can prevent damage to the infill plate 16 on a curve of the conveying path H.

In the conveyor device 10, the position of the swing bar 38 is set with respect to the coupler 22 according to the length of the travel unit 20 in the traveling direction or the width of the tray 14. This can sufficiently suppress the twisting of the infill plate 16 on a curve of the conveying path H and more properly correct a displacement between the tilting position (angle of tilt) of the tray 14 and the tilting position (angle of tilt) of the infill plate 16 on the curve.

Moreover, in the conveyor device 10, the swing bar 38 is disposed above the rear end of the plate-tilting shaft 32 and the coupler 22 is disposed below the front end of the plate-tilting shaft 32. This can sufficiently suppress the twisting of the infill plate 16 on a curve of the conveying path H and more properly correct a displacement between the tilting position (angle of tilt) of the tilted tray 14 and the tilting position (angle of tilt) of the infill plate 16 on the curve.

In the present embodiment, the infill plate 16 is urged, but not exclusively, by the springs 36. For example, the infill plate 16 may not be urged by the springs 36 as long as the infill plate 16 is made of an elastic material to cover a clearance between the tray 14 and the infill plate 16.

The shapes of the tray 14 and the infill plate 16 are not limited to those of the present embodiment. Any shapes may be used as long as the functions of the tray 14 and the infill plate 16 can be sufficiently performed.

Furthermore, the predetermined distance L (a distance between the coupler 22 and the swing bar 38) is set according to, but not exclusively, the length of the travel unit 20 in the traveling direction or the width of the tray 14 (infill plate 16). The predetermined distance L may be set according to the length of the tray 14 (infill plate 16) in the longitudinal direction (the same direction as the conveying direction W) or a height from the travel unit 20 to the swing bar 38 (the pivot for swinging the infill plate 16).

Having described the invention, the following is claimed:

1. A conveyor device for conveying articles, comprising:
   a plurality of travel units traveling along a conveying path for the articles;
   article supports that support the articles and are provided for the respective travel units so as to travel on the conveying path; and
   infilling members provided for the respective article supports, the infilling member covering a clearance left between the article supports adjacent to each other along a traveling direction of the travel unit,
   wherein the travel unit supports the article support and the infilling member so as to laterally tilt the article support and the infilling member with respect to the traveling direction,
   the travel unit is connected via a coupler to the adjacent travel unit in the traveling direction,
   the infilling member covers a clearance left between the article support supported by the travel unit supporting the infilling member and the article support supported by the travel unit that travels ahead of the travel unit supporting the infilling member,
   the infilling member is supported by a tilting shaft so as to laterally tilt with respect to the traveling direction of the travel unit, the tilting shaft being extended in the traveling direction of the travel unit and supported by the travel unit,
   the infilling member is supported by a swing shaft so as to vertically swing with respect to the traveling direction of the travel unit, the swing shaft being laterally extended with respect to the traveling direction of the travel unit and supported by the tilting shaft, and
   the swing shaft is disposed at a position shifted by a predetermined distance in a direction opposite to the traveling direction of the travel unit from a position of the coupler connecting the travel unit supporting the tilting shaft and the travel unit traveling ahead.

2. The conveyor device according to claim 1, wherein the predetermined distance for the swing shaft is determined according to a length of the travel unit in the traveling direction.

3. The conveyor device according to claim 1, wherein the predetermined distance for the swing shaft is determined according to a width of the article support.

4. The conveyor device according to claim 1, wherein the swing shaft supports the infilling member above a rear end of the tilting shaft, and
   the coupler connects the travel units below a front end of the tilting shaft.

* * * * *